US012560932B2

(12) United States Patent
Hiranaka et al.

(10) Patent No.: US 12,560,932 B2
(45) Date of Patent: Feb. 24, 2026

(54) WORK SITE MANAGEMENT SYSTEM AND WORK SITE MANAGEMENT METHOD

(71) Applicants: Komatsu Ltd., Tokyo (JP); Toyota Jidosha Kabushiki Kaisha, Toyota (JP)

(72) Inventors: Takashi Hiranaka, Tokyo (JP); Shota Konishi, Tokyo (JP); Shun Mizoo, Zama (JP); Shun Maruyama, Numazu (JP); Takahiro Okano, Chiryu (JP); Toru Takashima, Susono (JP)

(73) Assignees: KOMATSU LTD., Tokyo (JP); Toyota Jidosha Kabushiki Kaisha, Toyota (JP)

( * ) Notice: Subject to any disclaimer, the term of this patent is extended or adjusted under 35 U.S.C. 154(b) by 345 days.

(21) Appl. No.: 18/302,194

(22) Filed: Apr. 18, 2023

(65) Prior Publication Data

US 2023/0341857 A1      Oct. 26, 2023

(30) Foreign Application Priority Data

Apr. 22, 2022      (JP) ................................. 2022-070691

(51) Int. Cl.
    *G05D 1/00*        (2024.01)
    *B60W 50/14*       (2020.01)

(52) U.S. Cl.
    CPC .......... *G05D 1/0214* (2013.01); *B60W 50/14* (2013.01); *G05D 1/0278* (2013.01); *G05D 1/0289* (2013.01); *B60W 2050/143* (2013.01); *B60W 2050/146* (2013.01); *B60W 2556/45* (2020.02)

(58) Field of Classification Search
    CPC .. G05D 1/0214; G05D 1/0278; G05D 1/0289; B60W 50/14; B60W 2556/45; B60W 2050/143; B60W 2050/146

USPC .......................................................... 701/301
See application file for complete search history.

(56) References Cited

U.S. PATENT DOCUMENTS

| | | | | |
|---|---|---|---|---|
| 5,610,815 | A * | 3/1997 | Gudat ..................... | G01S 19/46 |
| | | | | 73/178 R |
| 5,615,116 | A * | 3/1997 | Gudat .................... | B60K 31/04 |
| | | | | 318/587 |
| 6,246,932 | B1 * | 6/2001 | Kageyama ........... | G05D 1/0297 |
| | | | | 701/50 |
| 8,392,065 | B2 * | 3/2013 | Tolstedt ............... | G05D 1/0214 |
| | | | | 701/41 |
| 9,595,196 | B1 * | 3/2017 | Hiranaka ............... | G08G 1/164 |
| 10,126,742 | B2 * | 11/2018 | Ross .................... | G05D 1/0274 |

(Continued)

FOREIGN PATENT DOCUMENTS

| | | |
|---|---|---|
| JP | 2000-339029 A | 12/2000 |
| JP | 2016071566 A | 5/2016 |

(Continued)

OTHER PUBLICATIONS

Office Action mailed Mar. 6, 2024, issued for the corresponding Australian patent application No. 2023202373.

*Primary Examiner* — Luis A Martinez Borrero
(74) *Attorney, Agent, or Firm* — Troutman Pepper Locke LLP

(57) ABSTRACT

A work site management system includes: a traveling path generation unit that generates a traveling path; and a protection area setting unit that sets a protection area in which a target vehicle is to be present based on a position of a first unmanned vehicle traveling in a work site along the traveling path.

20 Claims, 12 Drawing Sheets

(56)                References Cited

U.S. PATENT DOCUMENTS

| | | | | |
|---|---|---|---|---|
| 10,255,811 | B2 | 4/2019 | Naka et al. | |
| 11,307,592 | B2 * | 4/2022 | Sudou | G06Q 10/047 |
| 11,940,802 | B2 * | 3/2024 | Hiranaka | G05D 1/0282 |
| 12,005,898 | B2 | 6/2024 | Sakayori et al. | |
| 12,240,490 | B2 * | 3/2025 | Kanai | B60W 60/001 |
| 2001/0044697 | A1 * | 11/2001 | Kageyama | G08G 1/207 |
| | | | | 701/482 |
| 2007/0293996 | A1 * | 12/2007 | Mori | G01C 21/005 |
| | | | | 701/23 |
| 2009/0118889 | A1 * | 5/2009 | Heino | E21C 41/00 |
| | | | | 318/587 |
| 2010/0063663 | A1 * | 3/2010 | Tolstedt | G05D 1/0231 |
| | | | | 701/41 |
| 2010/0063680 | A1 * | 3/2010 | Tolstedt | G05D 1/0214 |
| | | | | 701/1 |
| 2011/0112730 | A1 * | 5/2011 | Rekow | G05D 1/0291 |
| | | | | 701/50 |
| 2016/0109885 | A1 * | 4/2016 | Fujimoto | G05D 1/0219 |
| | | | | 701/23 |
| 2016/0120095 | A1 * | 5/2016 | Fujimoto | G05D 1/0295 |
| | | | | 701/24 |
| 2016/0171894 | A1 * | 6/2016 | Harvey | G05D 1/0027 |
| | | | | 701/23 |
| 2016/0224029 | A1 * | 8/2016 | Tojima | G05D 1/0297 |
| 2016/0362048 | A1 * | 12/2016 | Matthews | G01S 19/42 |
| 2017/0038777 | A1 | 2/2017 | Harvey | |
| 2017/0145663 | A1 * | 5/2017 | Hiranaka | G08B 5/36 |
| 2017/0236422 | A1 * | 8/2017 | Naka | G08G 1/165 |
| | | | | 701/301 |
| 2017/0318732 | A1 * | 11/2017 | Yamashita | G05D 1/02 |
| 2018/0210440 | A1 * | 7/2018 | Matsuzaki | G05D 1/0027 |
| 2018/0338408 | A1 * | 11/2018 | Shinkai | G05D 1/0287 |
| 2019/0304311 | A1 * | 10/2019 | Shinkai | G05D 1/0295 |
| 2020/0064863 | A1 * | 2/2020 | Tomita | A01B 69/00 |
| 2020/0164980 | A1 * | 5/2020 | Sudou | G08G 1/205 |
| 2020/0307437 | A1 * | 10/2020 | Thieberger | G05D 1/6985 |
| 2021/0157324 | A1 * | 5/2021 | Sudou | G05D 1/0214 |
| 2022/0044567 | A1 * | 2/2022 | Liollio | G08G 1/096725 |
| 2022/0091612 | A1 * | 3/2022 | Solanki | G05D 1/0282 |
| 2022/0198927 | A1 * | 6/2022 | Hiranaka | G05D 1/24 |
| 2022/0332318 | A1 | 10/2022 | Sakayori et al. | |
| 2022/0412018 | A1 * | 12/2022 | Doy | E01C 19/23 |
| 2023/0311937 | A1 * | 10/2023 | Kanai | G05D 1/85 |
| | | | | 701/23 |
| 2023/0315119 | A1 * | 10/2023 | Hamalainen | G05D 1/245 |
| | | | | 701/25 |
| 2023/0324928 | A1 * | 10/2023 | Kanai | E02F 9/2045 |
| | | | | 701/25 |
| 2023/0341858 | A1 * | 10/2023 | Hiranaka | G05D 1/0282 |
| 2024/0134395 | A1 * | 4/2024 | Maeda | G05D 1/6484 |
| 2024/0370596 | A1 * | 11/2024 | Santarone | G06Q 99/00 |
| 2025/0054387 | A1 * | 2/2025 | Maruyama | G08G 1/091 |

FOREIGN PATENT DOCUMENTS

| | | | |
|---|---|---|---|
| JP | 2020-197885 A | 12/2020 |
| JP | 2021160458 A | 10/2021 |

* cited by examiner

WORK SITE MANAGEMENT SYSTEM AND WORK SITE MANAGEMENT METHOD

CROSS-REFERENCE TO RELATED APPLICATION(S)

The present application claims priority to and incorporates by reference the entire contents of Japanese Patent Application No. 2022-070691 filed in Japan on Apr. 22, 2022.

BACKGROUND OF THE INVENTION

1. Field of the Invention

The present disclosure relates to a work site management system and a work site management method.

2. Description of the Related Art

An unmanned vehicle operates in a wide work site such as a mine. The unmanned vehicle is managed by a management system. As disclosed in JP 2000-339029 A, an escort vehicle may travel through a work site while escorting an escorted vehicle.

The escorted vehicle which is a target vehicle for escorting is a manned vehicle. The escorted vehicle may travel in an unexpected direction due to, for example, a driving skill of a driver of the escorted vehicle.

An object of the present disclosure is to properly guide a target vehicle for escorting.

SUMMARY OF THE INVENTION

It is an object of the present invention to at least partially solve the problems in the conventional technology.

According to an aspect of the present invention, a work site management system comprises: a traveling path generation unit that generates a traveling path; and a protection area setting unit that sets a protection area in which a target vehicle is to be present based on a position of a first unmanned vehicle traveling in a work site along the traveling path.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments according to the present disclosure will be described with reference to the drawings, but the present disclosure is not limited the embodiments. Components of the embodiments to be described below can be combined as appropriate. In addition, some components are not used in some cases.

First Embodiment

A first embodiment will be described.
Work Site

Figure 1:
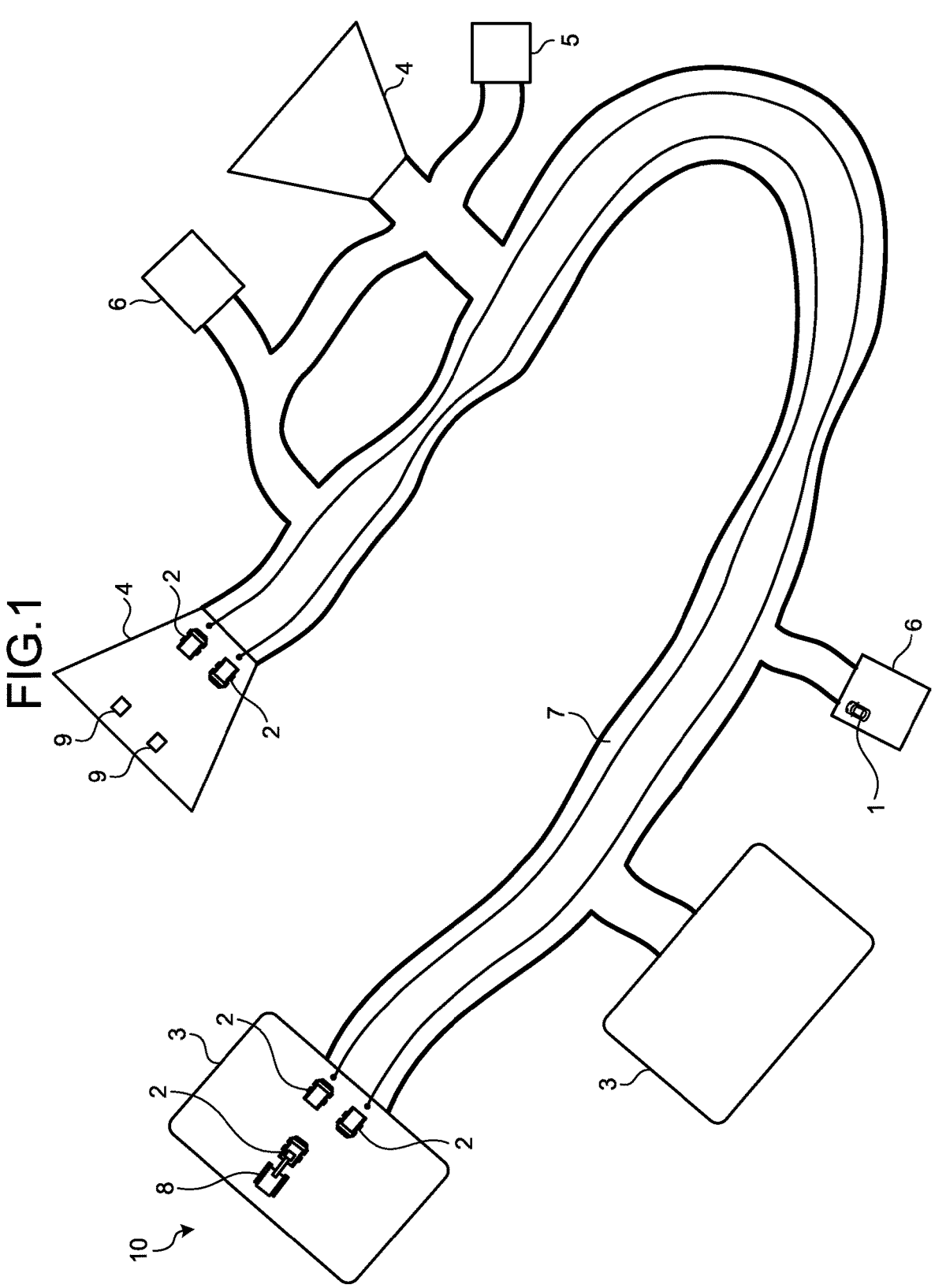
FIG. 1 is a schematic view illustrating a work site according to a first embodiment.

FIG. 1 is a schematic view illustrating a work site 10 according to the present embodiment. A mine or a quarry is exemplified as the work site 10. The mine refers to a place or a business place where minerals are mined. The quarry refers to a place or business place where stones are mined. Examples of the mine include a metal mine for mining metal, a non-metal mine for mining limestone, and a coal mine for mining coal.

A first unmanned vehicle 1 and a second unmanned vehicle 2 operate in the work site 10. The unmanned vehicle refers to a vehicle that operates in an unmanned manner without depending on a driving operation by a driver. The first unmanned vehicle 1 and the second unmanned vehicle 2 may be work vehicles that perform predetermined work or do not have to be work vehicles.

In the present embodiment, the first unmanned vehicle 1 is a lightweight vehicle that travels in the work site 10 in an unmanned manner. In the present embodiment, the first unmanned vehicle 1 is referred to as an unmanned light vehicle 1 as appropriate.

In the present embodiment, the second unmanned vehicle 2 is a heavy vehicle that travels in the work site 10 in an unmanned manner. In the present embodiment, the second unmanned vehicle 2 is a work vehicle. The second unmanned vehicle 2 is a haul vehicle that performs a transport operation of transporting a load. In the present embodiment, the second unmanned vehicle 2 is referred to as an unmanned dump truck 2 as appropriate.

The work site 10 includes a loading area 3, a dumping area 4, a parking area 5, a standby area 6, and a traveling road 7.

The loading area 3 is an area in which loading work for loading a load onto the unmanned dump truck 2 is performed. As the load, an excavated object excavated in the loading area 3 is exemplified. A loader 8 operates in the loading area 3. As the loader 8, an excavator is exemplified.

The dumping area 4 is an area in which dumping work for unloading a load from the unmanned dump truck 2 is performed. A crusher 9 is provided in the dumping area 4.

The parking area 5 is an area where the unmanned dump truck 2 is parked.

The standby area 6 is an area where the unmanned light vehicle 1 stands by.

The traveling road 7 refers to an area where at least one of the unmanned light vehicle 1 or the unmanned dump truck 2 travels. The traveling road 7 is provided in such a way as to connect at least the loading area 3 and the dumping area 4. In the present embodiment, the traveling road 7 is connected to each of the loading area 3, the dumping area 4, the parking area 5, and the standby area 6.

The unmanned light vehicle 1 can travel in each of the loading area 3, the dumping area 4, the standby area 6, and the traveling road 7. The unmanned dump truck 2 can travel in each of the loading area 3, the dumping area 4, the parking area 5, and the traveling road 7. For example, the unmanned dump truck 2 travels on the traveling road 7 in such a way as to reciprocate between the loading area 3 and the dumping area 4.

Management System

Figure 2:
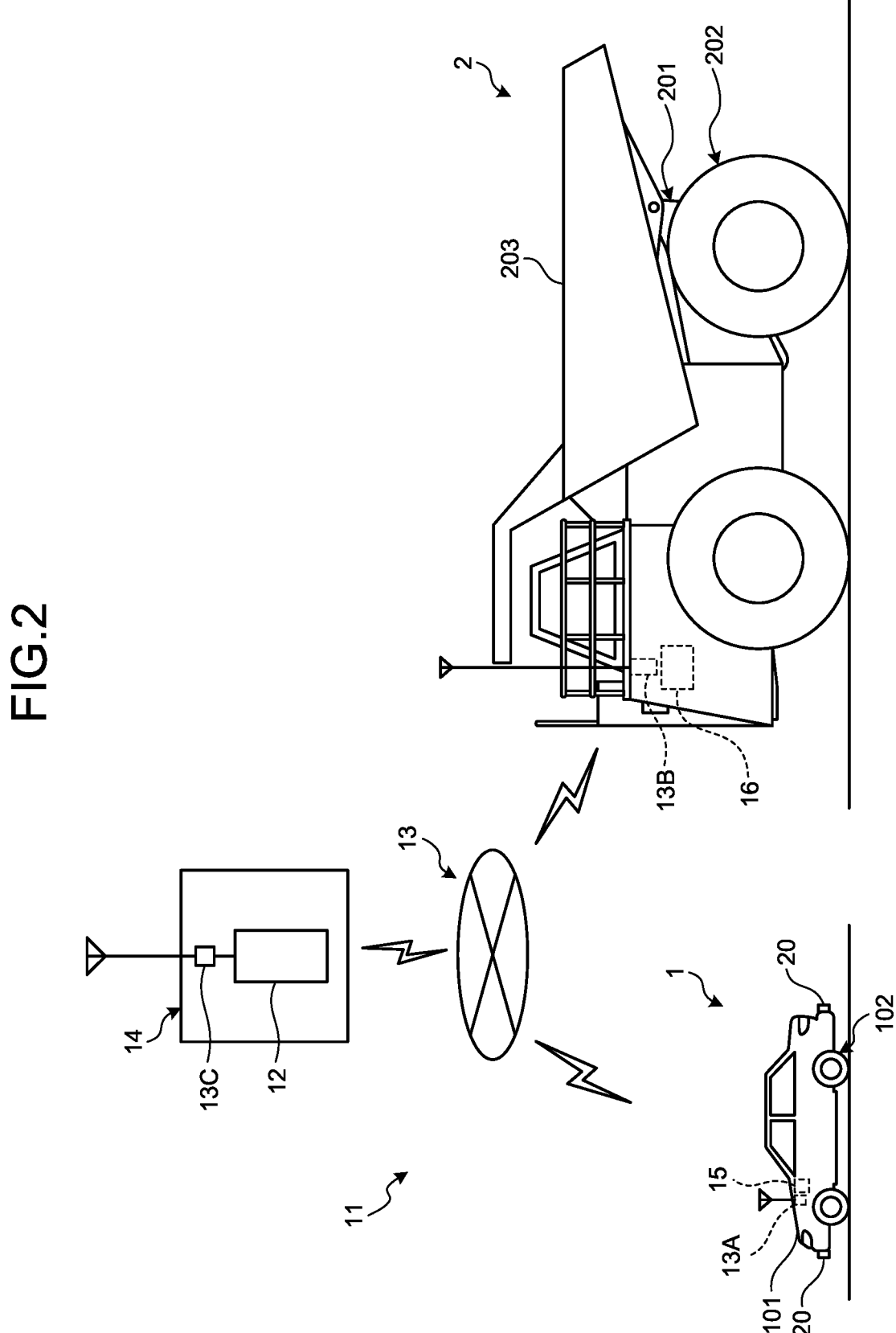
FIG. 2 is a schematic view illustrating a work site management system according to the first embodiment.

FIG. 2 is a schematic view illustrating a management system 11 for the work site 10 according to the present embodiment. The management system 11 includes a management device 12 and a communication system 13. The management device 12 is disposed outside the unmanned light vehicle 1 and the unmanned dump truck 2. The management device 12 is installed in a control facility 14 of the work site 10. The management device 12 includes a computer system. Examples of the communication system 13 include the Internet, a mobile phone communication network, a satellite communication network, and a local area network (LAN).

The unmanned light vehicle 1 includes a vehicle body 101, a traveling device 102, a control device 15, and a wireless communication device 13A. The control device 15 includes a computer system. The wireless communication device 13A is connected to the control device 15.

The unmanned dump truck 2 includes a vehicle body 201, a traveling device 202, a dump body 203, a control device 16, and a wireless communication device 13B. The control device 16 includes a computer system. The wireless communication device 13B is connected to the control device 16.

The communication system 13 includes the wireless communication device 13A connected to the control device 15, the wireless communication device 13B connected to the control device 16, and a wireless communication device 13C connected to the management device 12. The management device 12 and the control device 15 of the unmanned light vehicle 1 wirelessly communicate with each other via the communication system 13. The management device 12 and the control device 16 of the unmanned dump truck 2 wirelessly communicate with each other via the communication system 13.

The vehicle body 101 includes a vehicle body frame. The vehicle body 101 is supported by the traveling device 102. The traveling device 102 travels while supporting the vehicle body 101. The traveling device 102 includes a wheel, a tire mounted on the wheel, an engine, a brake device, and a steering device.

The vehicle body 201 includes a vehicle body frame. The vehicle body 201 is supported by the traveling device 202. The traveling device 202 travels while supporting the vehicle body 201. The traveling device 202 includes a wheel, a tire mounted on the wheel, an engine, a brake device, and a steering device. The dump body 203 is a member on which a load is loaded. The dump body 203 is supported by the vehicle body 201. The dump body 203 performs a dumping operation and a lowering operation. The dumping operation refers to an operation of separating the dump body 203 from the vehicle body 201 and inclining the dump body 203 in a dumping direction. The lowering operation refers to an operation of bringing the dump body 203 close to the vehicle body 201. When the loading work is performed, the dump body 203 performs the lowering operation. When the dumping work is performed, the dump body 203 performs the dumping operation.

Figure 3:
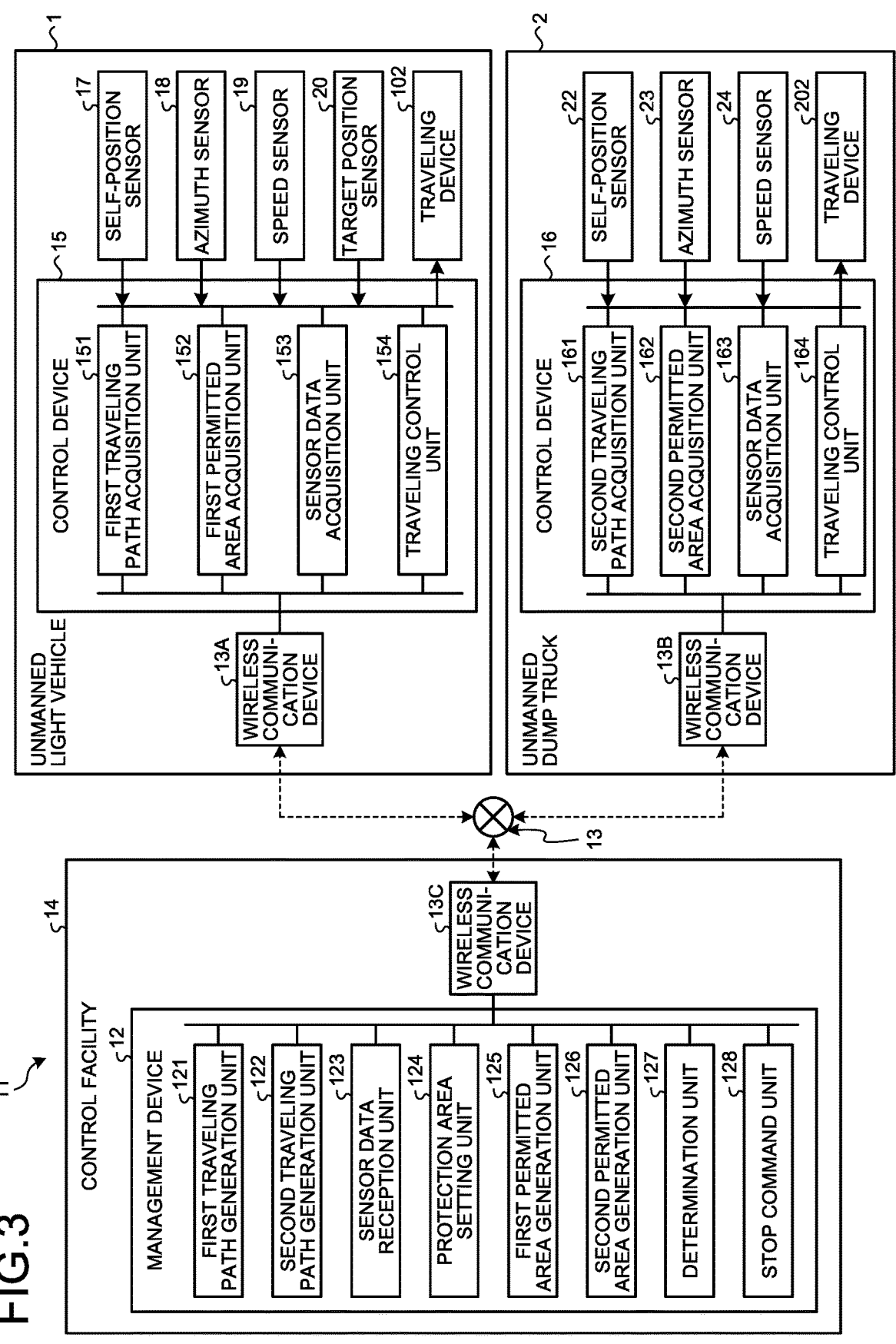
FIG. 3 is a block diagram illustrating the work site management system according to the first embodiment.

FIG. 3 is a block diagram illustrating the management system 11 for the work site 10 according to the present embodiment.

The unmanned light vehicle 1 includes the control device 15, the wireless communication device 13A, a self-position sensor 17, an azimuth sensor 18, a speed sensor 19, a target position sensor 20, and the traveling device 102. Each of the wireless communication device 13A, the self-position sensor 17, the azimuth sensor 18, the speed sensor 19, and the target position sensor 20 can communicate with the control device 15. The traveling device 102 is controlled by the control device 15.

The self-position sensor 17 detects a position of the unmanned light vehicle 1. The position of the unmanned light vehicle 1 is detected using a global navigation satellite system (GNSS). The global navigation satellite system includes a global positioning system (GPS). The global navigation satellite system detects a position in a global coordinate system defined by coordinate data of latitude, longitude, and altitude. The global coordinate system refers to a coordinate system fixed to the earth. The self-position sensor 17 includes a GNSS receiver and detects an absolute position of the unmanned light vehicle 1 indicating the position of the unmanned light vehicle 1 in the global coordinate system.

The azimuth sensor 18 detects an azimuth of the unmanned light vehicle 1. The azimuth of the unmanned light vehicle 1 includes a yaw angle of the unmanned light vehicle 1. In a case where an axis extending in a vertical direction at the center of gravity of the vehicle body 101 is a yaw axis, the yaw angle refers to a rotation angle around the yaw axis. As the azimuth sensor 18, a gyro sensor is exemplified.

The speed sensor 19 detects a traveling speed of the unmanned light vehicle 1. As the speed sensor 19, a pulse sensor that detects rotation of the wheel of the unmanned light vehicle 1 is exemplified.

The target position sensor 20 detects a relative position between the unmanned light vehicle 1 and a target object present around the unmanned light vehicle 1. The target position sensor 20 detects the target object in a non-contact manner. As the target position sensor 20, a laser sensor (light detection and ranging (LIDAR)) or a radar sensor (radio detection and ranging (RADAR)) is exemplified. Note that the target position sensor 20 may be an imaging device that images a target object and detects a relative position with respect to the target object. As illustrated in FIG. 2, the target position sensor 20 is disposed at each of a front portion of the vehicle body 101 and a rear portion of the vehicle body 101.

The unmanned dump truck 2 includes the control device 16, the wireless communication device 13B, a self-position sensor 22, an azimuth sensor 23, a speed sensor 24, and the traveling device 202. Each of the wireless communication device 13B, the self-position sensor 22, the azimuth sensor 23, and the speed sensor 24 can communicate with the control device 16. The traveling device 202 is controlled by the control device 16.

The self-position sensor 22 detects a position of the unmanned dump truck 2. The self-position sensor 22 includes a GNSS receiver and detects an absolute position of the unmanned dump truck 2 indicating the position of the unmanned dump truck 2 in the global coordinate system.

The azimuth sensor 23 detects an azimuth of the unmanned dump truck 2. As the azimuth sensor 23, a gyro sensor is exemplified.

The speed sensor 24 detects a traveling speed of the unmanned dump truck 2. As the speed sensor 24, a pulse sensor that detects rotation of the wheel of the unmanned dump truck 2 is exemplified.

The management device 12 includes a first traveling path generation unit 121, a second traveling path generation unit 122, a sensor data reception unit 123, a protection area setting unit 124, a first permitted area generation unit 125, a second permitted area generation unit 126, a determination unit 127, and a stop command unit 128.

The first traveling path generation unit 121 generates travel data indicating a travel condition of the unmanned light vehicle 1. The first traveling path generation unit 121 transmits the travel data to the unmanned light vehicle 1 via the communication system 13.

The second traveling path generation unit 122 generates travel data indicating a travel condition of the unmanned dump truck 2. The second traveling path generation unit 122 transmits the travel data to the unmanned dump truck 2 via the communication system 13.

The sensor data reception unit 123 acquires detection data of the self-position sensor 17 and detection data of the target position sensor 20 of the unmanned light vehicle 1 from the control device 15 of the unmanned light vehicle 1 via the communication system 13.

The protection area setting unit 124 sets a protection area 63 in which a target vehicle 100 to be described later is to be present.

The first permitted area generation unit 125 generates a permitted area 33 in which traveling of the unmanned light vehicle 1 is permitted. The first permitted area generation unit 125 transmits the permitted area 33 to the unmanned light vehicle 1 via the communication system 13.

The second permitted area generation unit 126 generates a permitted area 43 in which traveling of the unmanned dump truck 2 is permitted. The second permitted area generation unit 126 transmits the permitted area 43 to the unmanned dump truck 2 via the communication system 13.

The determination unit 127 determines whether or not the target vehicle 100 has deviated from the protection area 63. The determination unit 127 determines whether or not the target vehicle 100 has deviated from the protection area 63 based on a relative position between the unmanned light vehicle 1 and the target vehicle 100. The determination unit 127 determines whether or not the target vehicle 100 has deviated from the protection area 63 based on the detection data of the target position sensor 20 received by the sensor data reception unit 123.

In a case where the determination unit 127 determines that the target vehicle 100 has deviated from the protection area 63, the stop command unit 128 stops the unmanned dump truck 2 traveling at the work site 10.

The control device 15 includes a first traveling path acquisition unit 151, a first permitted area acquisition unit 152, a sensor data acquisition unit 153, and a traveling control unit 154.

The first traveling path acquisition unit 151 acquires the travel data of the unmanned light vehicle 1 generated by the first traveling path generation unit 121 from the management device 12 via the communication system 13.

The first permitted area acquisition unit 152 acquires the permitted area 33 of the unmanned light vehicle 1 generated by the first permitted area generation unit 125 from the management device 12 via the communication system 13.

The sensor data acquisition unit 153 acquires the detection data of the self-position sensor 17, the detection data of the azimuth sensor 18, the detection data of the speed sensor 19, and the detection data of the target position sensor 20.

The traveling control unit 154 controls the traveling device 102 based on the travel data of the unmanned light vehicle 1 acquired by the first traveling path acquisition unit 151, the permitted area 33 of the unmanned light vehicle 1 acquired by the first permitted area acquisition unit 152, and the detection data acquired by the sensor data acquisition unit 153.

The control device 16 includes a second traveling path acquisition unit 161, a second permitted area acquisition unit 162, a sensor data acquisition unit 163, and a traveling control unit 164.

The second traveling path acquisition unit 161 acquires the travel data of the unmanned dump truck 2 generated by the second traveling path generation unit 122 from the management device 12 via the communication system 13.

The second permitted area acquisition unit 162 acquires the permitted area 43 of the unmanned dump truck 2 generated by the second permitted area generation unit 126 from the management device 12 via the communication system 13.

The sensor data acquisition unit 163 acquires the detection data of the self-position sensor 22, the detection data of the azimuth sensor 23, and the detection data of the speed sensor 24.

The traveling control unit 164 controls the traveling device 202 based on the travel data of the unmanned dump truck 2 acquired by the second traveling path acquisition unit 161, the permitted area 43 of the unmanned dump truck 2 acquired by the second permitted area acquisition unit 162, and the detection data acquired by the sensor data acquisition unit 163.

Figure 4:
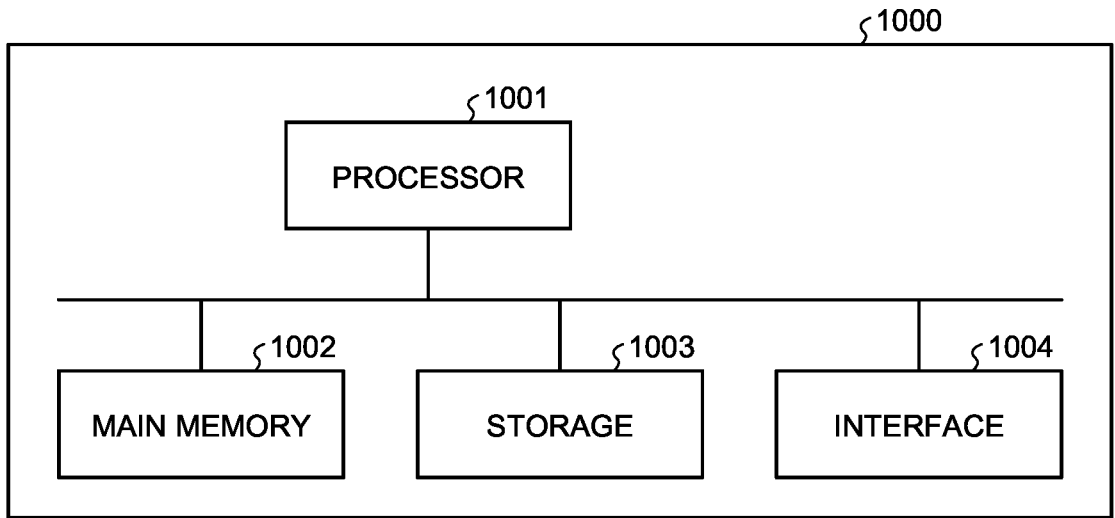
FIG. 4 is a hardware configuration diagram of a management device according to the first embodiment.

FIG. 4 is a hardware configuration diagram of the management device 12 according to the present embodiment. The management device 12 includes a computer system 1000. The computer system 1000 includes a processor 1001 such as a central processing unit (CPU), a main memory 1002 including a non-volatile memory such as a read only memory (ROM) and a volatile memory such as a random access memory (RAM), a storage 1003, and an interface 1004 including an input/output circuit. A function of the management device 12 described above is stored in the storage 1003 as a computer program. The processor 1001 reads the computer program from the storage 1003, loads the computer program to the main memory 1002, and performs the above-described processing according to the program. Note that the computer program may be distributed to the computer system 1000 via a network.

Each of the control device 15 and the control device 16 includes the computer system 1000 as illustrated in FIG. 4.

The function of each of the control device 15 and the control device 16 described above is stored in the storage 1003 as a computer program.

Travel Data and Permitted Area

Figure 5:
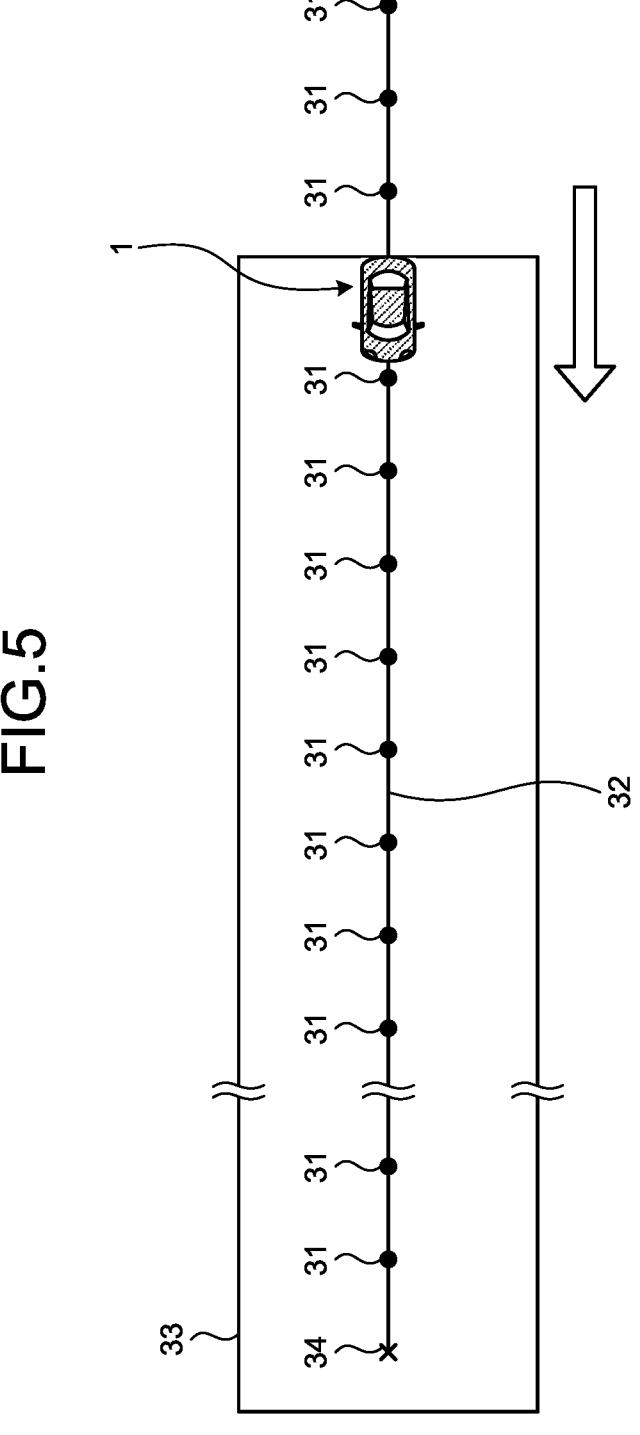
FIG. 5 is a schematic view for explaining travel data and a permitted area of an unmanned light vehicle according to the first embodiment.

FIG. 5 is a schematic view for explaining the travel data and the permitted area 33 of the unmanned light vehicle 1 according to the present embodiment.

The travel data of the unmanned light vehicle 1 defines the travel condition of the unmanned light vehicle 1. The travel data of the unmanned light vehicle 1 includes a traveling point 31, a traveling path 32, a target position of the unmanned light vehicle 1, a target azimuth of the unmanned light vehicle 1, and a target traveling speed of the unmanned light vehicle 1. The travel data of the unmanned light vehicle 1 including the traveling path 32 is generated by the first traveling path generation unit 121.

A plurality of traveling points 31 are set at the work site 10. The traveling point 31 defines the target position of the unmanned light vehicle 1. The target azimuth of the unmanned light vehicle 1 and the target traveling speed of the unmanned light vehicle 1 are set for each of the plurality of traveling points 31. The plurality of traveling points 31 are set at intervals. The intervals between the traveling points 31 may be uniform or non-uniform.

The traveling path 32 refers to a virtual line indicating a target traveling route of the unmanned light vehicle 1. The traveling path 32 is defined by a trajectory passing through the plurality of traveling points 31. The unmanned light vehicle 1 travels in the work site 10 along the traveling path 32. The unmanned light vehicle 1 travels in such a way that the center of the unmanned light vehicle 1 in a vehicle width direction of the unmanned light vehicle 1 coincides with the traveling path 32.

The target position of the unmanned light vehicle 1 refers to a target position of the unmanned light vehicle 1 when passing through the traveling point 31. The target position of the unmanned light vehicle 1 may be defined in a local coordinate system of the unmanned light vehicle 1 or may be defined in the global coordinate system.

The target azimuth of the unmanned light vehicle 1 refers to a target azimuth of the unmanned light vehicle 1 when passing through the traveling point 31.

The target traveling speed of the unmanned light vehicle 1 refers to a target traveling speed of the unmanned light vehicle 1 when passing through the traveling point 31.

The first permitted area generation unit 125 generates the permitted area 33 in which traveling of the unmanned light vehicle 1 is permitted and a stop point 34 of the unmanned light vehicle 1. The permitted area 33 functions as an entry prohibited area in which entry of another unmanned light vehicle 1 traveling around the unmanned light vehicle 1 and the unmanned dump truck 2 is prohibited. The permitted area 33 is set in the traveling direction of the unmanned light vehicle 1. In a case where the unmanned light vehicle 1 moves forward, at least a part of the permitted area 33 is set in front of the unmanned light vehicle 1. The permitted area 33 is set in a band shape in such a way as to include the traveling path 32. The permitted area 33 is set in such a way as to include the unmanned light vehicle 1. The width of the permitted area 33 is larger than the width of the unmanned light vehicle 1 in the vehicle width direction of the unmanned light vehicle 1. The stop point 34 is set at a tip portion of the permitted area 33. The traveling speed of the unmanned light vehicle 1 is controlled in such a way that the unmanned light vehicle 1 can stop at the stop point 34.

Figure 6:
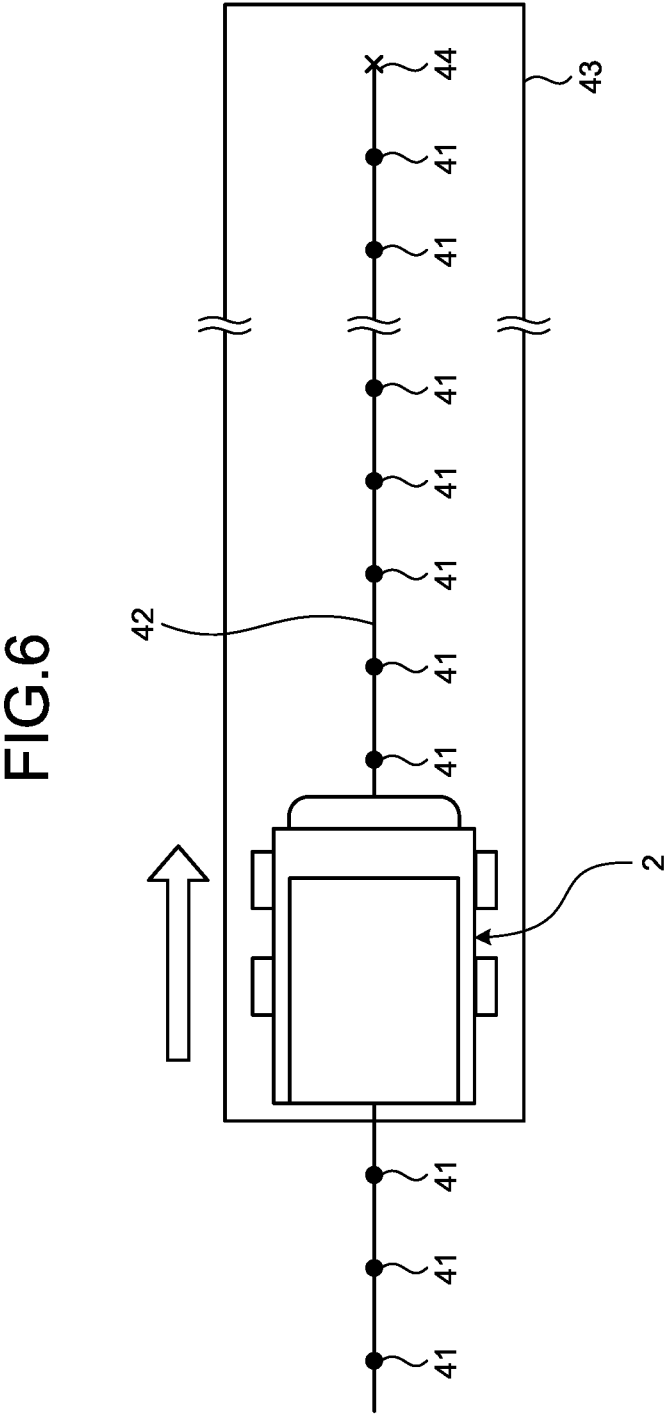
FIG. 6 is a schematic view for explaining travel data and a permitted area of an unmanned dump truck according to the first embodiment.

FIG. 6 is a schematic view for explaining the travel data and the permitted area 43 of the unmanned dump truck 2 according to the present embodiment.

The travel data of the unmanned dump truck 2 defines the travel condition of the unmanned dump truck 2. The travel data of the unmanned dump truck 2 includes a traveling point 41, a traveling path 42, a target position of the unmanned dump truck 2, a target azimuth of the unmanned dump truck 2, and a target traveling speed of the unmanned dump truck 2. The travel data of the unmanned dump truck 2 including the traveling path 42 is generated by the second traveling path generation unit 122. The unmanned dump truck 2 travels in such a way that the center of the unmanned dump truck 2 in a vehicle width direction of the unmanned dump truck 2 coincides with the traveling path 42. Since the function of the traveling point 41 and the function of the traveling path 42 of the unmanned dump truck 2 are similar to the function of the traveling point 31 and the function of the traveling path 32 of the unmanned light vehicle 1, a description thereof will be omitted.

The second permitted area generation unit 126 generates the permitted area 43 in which traveling of the unmanned dump truck 2 is permitted and a stop point 44 of the unmanned dump truck 2. The permitted area 43 is set in such a way as to include the unmanned dump truck 2. The width of the permitted area 43 is larger than the width of the unmanned dump truck 2 in the vehicle width direction of the unmanned dump truck 2. Since the function of the permitted area 43 and the function of the stop point 44 of the unmanned dump truck 2 are similar to the function of the permitted area 33 and the function of the stop point 34 of the unmanned light vehicle 1, a description thereof will be omitted.

The first permitted area generation unit 125 generates the permitted area 33 for each of a plurality of unmanned light vehicles 1. The first permitted area generation unit 125 generates the permitted area 33 in such a way that the plurality of permitted areas 33 do not overlap each other. The first permitted area generation unit 125 generates the permitted area 33 in such a way as not to overlap with the permitted area 43 of the unmanned dump truck 2.

The second permitted area generation unit 126 generates the permitted area 43 for each of a plurality of unmanned dump trucks 2. The second permitted area generation unit 126 generates the permitted area 43 in such a way that the plurality of permitted areas 43 do not overlap each other. The second permitted area generation unit 126 generates the permitted area 43 in such a way as not to overlap with the permitted area 33 of the unmanned light vehicle 1.

The first permitted area generation unit 125 sequentially updates the permitted area 33 as the unmanned light vehicle 1 travels. The first permitted area generation unit 125 sequentially releases the permitted area 33 through which the unmanned light vehicle 1 has passed. The first permitted area generation unit 125 sequentially extends the permitted area 33 before the unmanned light vehicle 1 passes in the traveling direction of the unmanned light vehicle 1. As the permitted area 33 through which the unmanned light vehicle 1 has passed is released, another unmanned light vehicle 1 and the unmanned dump truck 2 can travel. As the permitted area 33 before the unmanned light vehicle 1 passes is extended, the traveling of the unmanned light vehicle 1 is continued. In a case where an event that the permitted area 33 cannot be extended occurs, the unmanned light vehicle 1 stops at the stop point 34. As the event that the permitted area 33 cannot be extended, an event in which another unmanned light vehicle 1 or the unmanned dump truck 2 stops in front of the permitted area 33 is exemplified.

The second permitted area generation unit 126 sequentially updates the permitted area 43 as the unmanned dump truck 2 travels. The second permitted area generation unit 126 sequentially releases the permitted area 43 through which the unmanned dump truck 2 has passed. The second permitted area generation unit 126 sequentially extends the permitted area 43 before the unmanned dump truck 2 passes in the traveling direction of the unmanned dump truck 2. As the permitted area 43 through which the unmanned dump truck 2 has passed is released, another unmanned dump truck 2 and the unmanned light vehicle 1 can travel. As the permitted area 43 before the unmanned dump truck 2 passes is extended, the traveling of the unmanned dump truck 2 is continued. In a case where an event that the permitted area 43 cannot be extended occurs, the unmanned dump truck 2 stops at the stop point 44. As the event that the permitted area 43 cannot be extended, an event in which another unmanned dump truck 2 or the unmanned light vehicle 1 stops in front of the permitted area 43 is exemplified.

The traveling control unit 154 controls the traveling device 102 in such a way that the unmanned light vehicle 1 travels along the traveling path 32 based on the travel data of the unmanned light vehicle 1, the permitted area 33 of the unmanned light vehicle 1, and the detection data acquired by the sensor data acquisition unit 153.

The traveling control unit 154 controls the traveling device 102 in such a way as to reduce a deviation between the detected position of the unmanned light vehicle 1 detected by the self-position sensor 17 when passing through the traveling point 31 and the target position of the unmanned light vehicle 1 set at the traveling point 31.

The traveling control unit 154 controls the traveling device 102 in such a way as to reduce a deviation between the detected azimuth of the unmanned light vehicle 1 detected by the azimuth sensor 18 when passing through the traveling point 31 and the target azimuth of the unmanned light vehicle 1 set for the traveling point 31.

The traveling control unit 154 controls the traveling device 102 in such a way as to reduce a deviation between the detected traveling speed of the unmanned light vehicle 1 detected by the speed sensor 19 when passing through the traveling point 31 and the target traveling speed of the unmanned light vehicle 1 set for the traveling point 31.

The traveling control unit 154 controls the traveling device 102 based on the permitted area 33 and the permitted area 43. In a case where the event that the permitted area 33 cannot be extended occurs, the traveling control unit 154 controls the traveling device 102 in such a way that the unmanned light vehicle 1 stops at the stop point 34. The traveling control unit 154 controls the traveling device 102 in such a way that the unmanned light vehicle 1 does not enter the permitted area 33 set for another unmanned light vehicle 1 and the permitted area 43 set for the unmanned dump truck 2.

The traveling control unit 164 controls the traveling device 202 in such a way that the unmanned dump truck 2 travels along the traveling path 42 based on the travel data of the unmanned dump truck 2, the permitted area 43 of the unmanned dump truck 2, and the detection data acquired by the sensor data acquisition unit 163.

The traveling control unit 164 controls the traveling device 202 in such a way as to reduce a deviation between the detection position of the unmanned dump truck 2 detected by the self-position sensor 22 when passing through the traveling point 41 and the target position of the unmanned dump truck 2 set at the traveling point 41.

The traveling control unit 164 controls the traveling device 202 in such a way as to reduce a deviation between the detected azimuth of the unmanned dump truck 2 detected by the azimuth sensor 23 when passing through the traveling point 41 and the target azimuth of the unmanned dump truck 2 set for the traveling point 41.

The traveling control unit 164 controls the traveling device 202 in such a way as to reduce a deviation between the detected traveling speed of the unmanned dump truck 2 detected by the speed sensor 24 when passing through the traveling point 41 and the target traveling speed of the unmanned dump truck 2 set for the traveling point 41.

The traveling control unit 164 controls the traveling device 202 based on the permitted area 43 and the permitted area 33. In a case where the event that the permitted area 43 cannot be extended occurs, the traveling control unit 164 controls the traveling device 202 in such a way that the unmanned dump truck 2 stops at the stop point 44. The traveling control unit 164 controls the traveling device 202 in such a way that the unmanned dump truck 2 does not enter the permitted area 43 set for another unmanned dump truck 2 and the permitted area 33 set for the unmanned light vehicle 1.

Escorting of Target Vehicle

Figure 7:
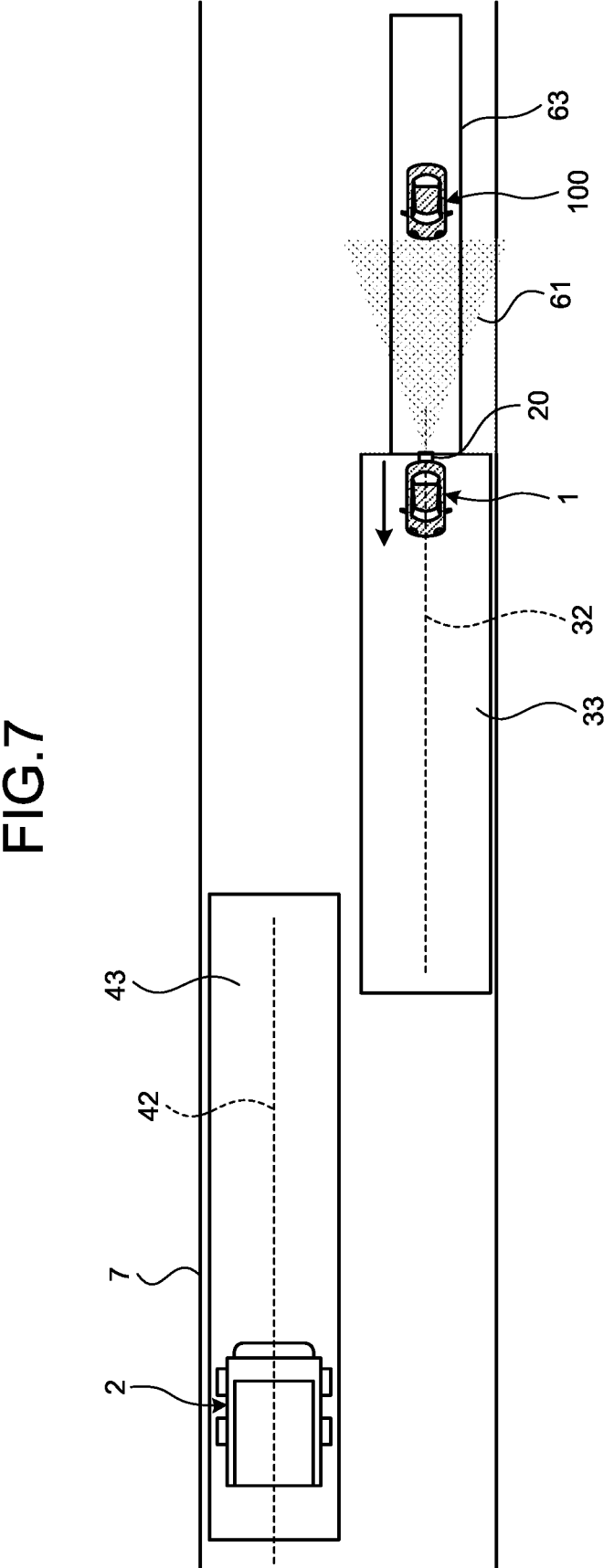
FIG. 7 is a view illustrating a state in which the unmanned light vehicle according to the first embodiment escorts a target vehicle.

FIG. 7 is a view illustrating a state in which the unmanned light vehicle 1 according to the present embodiment escorts the target vehicle 100.

As illustrated in FIG. 7, the unmanned light vehicle 1 escorts the target vehicle 100 at the work site 10. The target vehicle 100 is a target for escorting. The unmanned light vehicle 1 guides the target vehicle 100. In the present embodiment, the unmanned light vehicle 1 is an escorting vehicle, and the target vehicle 100 is an escorted vehicle.

The target vehicle 100 is a manned vehicle. The manned vehicle refers to a vehicle that travels by a driving operation of a driver in a driving room of the manned vehicle. The target vehicle 100 enters the work site 10 from the outside of the work site 10. A person who visits the work site 10 from the outside of the work site 10 boards the target vehicle 100. Examples of the target vehicle 100 include a manned vehicle on which a visitor who visits the work site 10 boards or a manned vehicle on which a worker who visits for maintenance of equipment boards.

The target vehicle 100 is a vehicle that is not managed by the management system 11. The target vehicle 100 is a vehicle that is not registered in the management system 11. The target vehicle 100 is a vehicle that cannot communicate with the management device 12. The management device 12 cannot recognize a position, azimuth, and traveling speed of the target vehicle 100.

The unmanned light vehicle 1 guides the target vehicle 100 to a destination of the work site 10. The unmanned light vehicle 1 travels in the work site 10 along the traveling path 32 generated by the first traveling path generation unit 121. FIG. 7 illustrates a state in which the unmanned light vehicle 1 travels on the traveling road 7 of the work site 10. The traveling path 32 is generated in such a way that the unmanned light vehicle 1 travels toward the destination of the work site 10.

In the present embodiment, the unmanned light vehicle 1 travels in front of the target vehicle 100. The driver of the target vehicle 100 drives the target vehicle 100 in such a way that the target vehicle 100 travels behind the unmanned light vehicle 1.

The protection area setting unit 124 sets, for the target vehicle 100, the protection area 63 in which the target vehicle 100 is to be present. The protection area setting unit 124 sets the protection area 63 for the target vehicle 100 based on the position of the unmanned light vehicle 1 traveling in the work site 10 along the traveling path 32. The protection area setting unit 124 sets the protection area 63 in such a way that the target vehicle 100 is located inside the protection area 63 based on the position of the unmanned light vehicle 1 guiding the target vehicle 100 and the size of the appearance of the target vehicle 100. The protection area setting unit 124 sets the protection area 63 in such a way that a peripheral edge of the protection area 63 is disposed outside the target vehicle 100.

In the embodiment, the protection area setting unit 124 sets the protection area 63 based on the position of the unmanned light vehicle 1 guiding the target vehicle 100 and the traveling path 32 of the unmanned light vehicle 1.

The unmanned light vehicle 1 includes the self-position sensor 17 that detects the position of the unmanned light vehicle 1. The traveling path 32 (traveling point 31) specifies the position of the unmanned light vehicle 1 traveling based on the traveling path 32. The protection area setting unit 124 sets the protection area 63 based on the detection data of the self-position sensor 17 and the position of the traveling path 32 (traveling point 31).

The protection area setting unit 124 sets the protection area 63 in such a way as to include at least a part of the unmanned light vehicle 1 based on the detection data of the self-position sensor 17. The protection area setting unit 124 sets the protection area 63 in such a way as to include at least a part of the traveling path 32 based on the position of the unmanned light vehicle 1 specified by the traveling path 32 (traveling point 31). In the present embodiment, the protection area setting unit 124 sets the protection area 63 in such a way as to include the traveling path 32 behind the unmanned light vehicle 1. The protection area 63 is set in a band shape behind the unmanned light vehicle 1. The position of a front end portion of the protection area 63 coincides with the position of at least a part of the unmanned light vehicle 1.

The target vehicle 100 travels substantially along the traveling path 32 by being guided by the unmanned light vehicle 1. The target vehicle 100 travels in such a way that the center of the target vehicle 100 and the traveling path 32 substantially coincide with each other in a vehicle width direction of the target vehicle 100. Since the protection area 63 is set in such a way as to include the traveling path 32, the target vehicle 100 can travel while being located inside the protection area 63.

The unmanned light vehicle 1 includes the target position sensor 20 that detects the relative position between the unmanned light vehicle 1 and the target vehicle 100. The target position sensor 20 is disposed at the rear portion of the vehicle body 101 of the unmanned light vehicle 1. A detection area 61 of the target position sensor 20 is defined behind the unmanned light vehicle 1. An inter-vehicle distance between the unmanned light vehicle 1 and the target vehicle 100 is maintained in such a way that the target vehicle 100 is located in the detection area 61. The target position sensor 20 can detect the relative position between the unmanned light vehicle 1 and the target vehicle 100 traveling behind the unmanned light vehicle 1.

The determination unit 127 determines whether or not the target vehicle 100 has deviated from the protection area 63 based on the detection data of the target position sensor 20.

As illustrated in FIG. 7, in the present embodiment, the traveling path 32 of the unmanned light vehicle 1 and the traveling path 42 of the unmanned dump truck 2 are set in such a way as to be arranged side by side on the traveling road 7. In the example illustrated in FIG. 7, the traveling path 32 and the traveling path 42 are substantially parallel. Further, the traveling path 32 and the traveling path 42 are set in such a way that the traveling road 7 is a two-lane two-way traveling road. The unmanned light vehicle 1 and the target vehicle 100, and the unmanned dump truck 2 travel while facing each other. The unmanned dump truck 2 is an oncoming vehicle of the unmanned light vehicle 1 and the target vehicle 100. In the traveling road 7, the unmanned light vehicle 1, the target vehicle 100, and the unmanned dump truck 2 travel in such a way as to pass each other. In the example illustrated in FIG. 7, the unmanned light vehicle 1 and the target vehicle 100 travel in a first direction on a left-side travel lane of the traveling road 7. The unmanned dump truck 2 travels in a second direction opposite to the first direction on a right-side travel lane of the traveling road 7.

The unmanned light vehicle 1 travels in such a way that the center of the unmanned light vehicle 1 in a vehicle width direction of the unmanned light vehicle 1 coincides with the traveling path 32. The unmanned dump truck 2 travels in such a way that the center of the unmanned dump truck 2 in a vehicle width direction of the unmanned dump truck 2 coincides with the traveling path 42. The permitted area 33 is set in such a way as to include the traveling path 32 and the unmanned light vehicle 1. The permitted area 43 is set in such a way as to include the traveling path 42 and the unmanned dump truck 2.

In a case where the traveling path 32 and the traveling path 42 are set in such a way that the traveling road 7 is a two-lane two-way traveling road, each of the traveling path 32, the traveling path 42, the permitted area 33, and the permitted area 43 is generated in such a way as to suppress approach or contact between the unmanned light vehicle 1 and the unmanned dump truck 2. The unmanned light vehicle 1 and the unmanned dump truck 2 can travel in such a way as to pass each other without approaching or coming into contact with each other.

The protection area setting unit 124 sets the protection area 63 in such a way that the protection area 63 does not overlap with the traveling path 42 and the permitted area 43 of the unmanned dump truck 2. The protection area setting unit 124 sets the protection area 63 in such a way that the protection area 63 is not disposed in the course of the unmanned dump truck 2 that is an oncoming vehicle of the target vehicle 100.

The protection area 63 may function as an entry prohibited area in which entry of the unmanned dump truck 2 traveling around the target vehicle 100 is prohibited. The traveling control unit 164 of the unmanned dump truck 2 controls the traveling device 202 of the unmanned dump truck 2 in such a way that the unmanned dump truck 2 does not enter the protection area 63. In a case where the protection area 63 is set in the course of the unmanned dump truck 2, the traveling control unit 164 of the unmanned dump truck 2 decelerates or stops the unmanned dump truck 2. As the protection area 63 is set for the target vehicle 100, the unmanned dump truck 2 is prevented from approaching or coming into contact with the target vehicle 100.

The target vehicle 100 travels substantially along the traveling path 32. Therefore, there is a low possibility that the target vehicle 100 and the unmanned dump truck 2 approach or come into contact with each other. Since the possibility that the target vehicle 100 and the unmanned dump truck 2 approach or come into contact with each other is low, the protection area setting unit 124 need not to set an excessively large protection area 63 to protect the target vehicle 100 in the protection area 63.

Management Method

Figure 8:
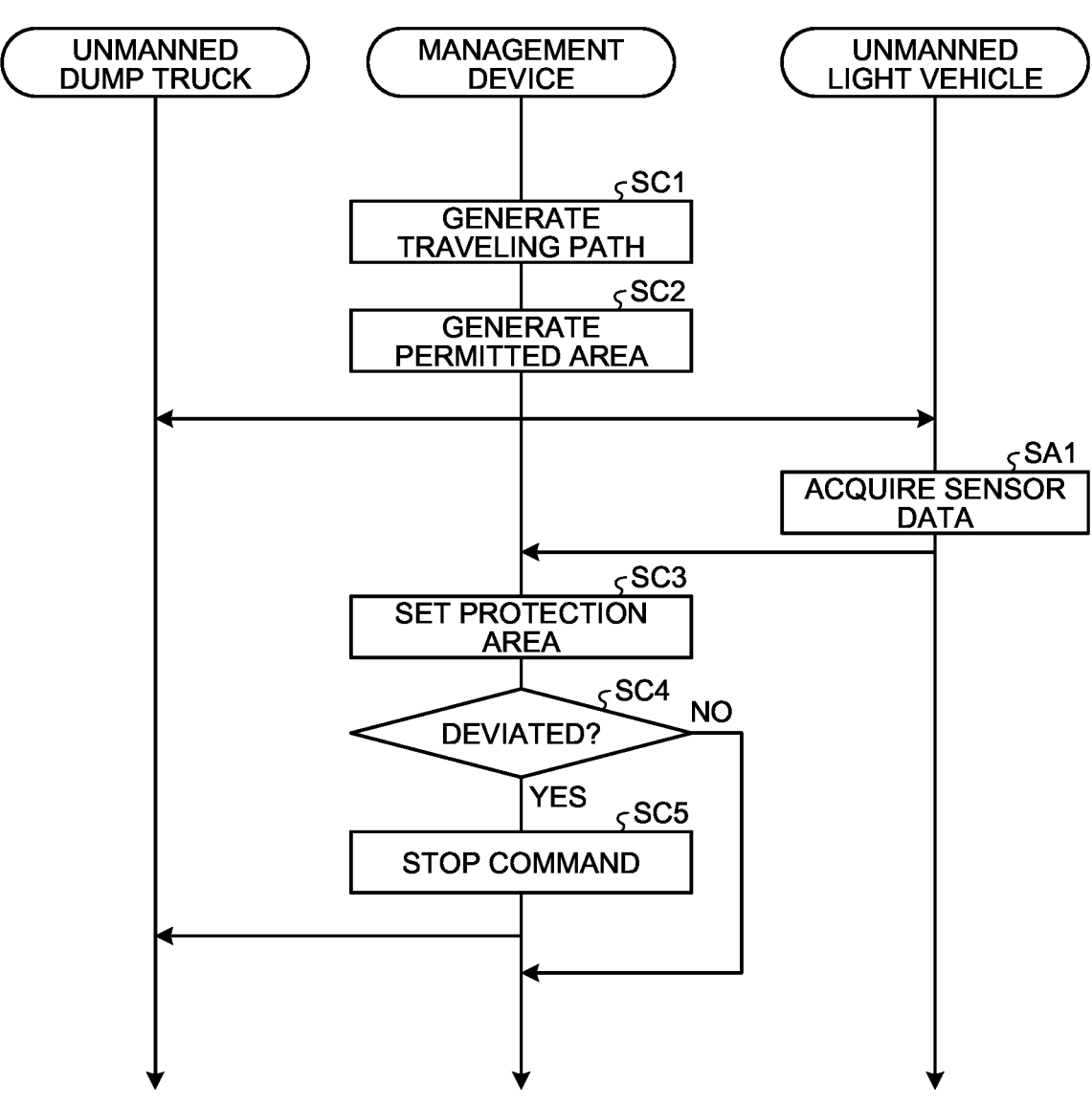
FIG. 8 is a flowchart illustrating a work site management method according to the first embodiment.

FIG. 8 is a flowchart illustrating a management method for the work site 10 according to the present embodiment.

The first traveling path generation unit 121 generates the travel data of the unmanned light vehicle 1 including the traveling path 32, and the second traveling path generation unit 122 generates the travel data of the unmanned dump truck 2 including the traveling path 42 (step SC1).

The first permitted area generation unit 125 generates the permitted area 33 of the unmanned light vehicle 1, and the second permitted area generation unit 126 generates the permitted area 43 of the unmanned dump truck 2 (step SC2).

The travel data of the unmanned light vehicle 1 including the traveling path 32 generated in step SC1 and the permitted area 33 of the unmanned light vehicle 1 generated in step SC2 are transmitted to the unmanned light vehicle 1 via the communication system 13. The first traveling path acquisition unit 151 acquires the travel data of the unmanned light vehicle 1 including the traveling path 32, and the first permitted area acquisition unit 152 acquires the permitted area 33 of the unmanned light vehicle 1. The traveling control unit 154 controls the traveling device 102 in such a way that the unmanned light vehicle 1 travels in the work site 10 based on the travel data of the unmanned light vehicle 1 including the traveling path 32 and the permitted area 33 of the unmanned light vehicle 1.

The travel data of the unmanned dump truck 2 including the traveling path 42 generated in step SC1 and the permitted area 43 of the unmanned dump truck 2 generated in step SC2 are transmitted to the unmanned dump truck 2 via the communication system 13. The second traveling path acquisition unit 161 acquires the travel data of the unmanned dump truck 2 including the traveling path 42, and the second permitted area acquisition unit 162 acquires the permitted area 43 of the unmanned dump truck 2. The traveling control unit 164 controls the traveling device 202 in such a way that the unmanned dump truck 2 travels in the work site 10 based on the travel data of the unmanned dump truck 2 including the traveling path 42 and the permitted area 43 of the unmanned dump truck 2.

In a case where the unmanned light vehicle 1 guides the target vehicle 100, the sensor data acquisition unit 153 acquires the detection data of the self-position sensor 17 and the detection data of the target position sensor 20 (step SA1).

The sensor data acquisition unit 153 transmits the detection data of the self-position sensor 17 and the detection data of the target position sensor 20 to the management device 12 via the communication system 13.

The sensor data reception unit 123 receives the detection data of the self-position sensor 17 and the detection data of the target position sensor 20 transmitted from the control device 15. The protection area setting unit 124 sets the protection area 63 for the target vehicle 100 based on the detection data of the self-position sensor 17 received by the sensor data reception unit 123 and the traveling path 32 generated by the first traveling path generation unit 121. The protection area setting unit 124 sets the protection area 63 in such a way as to include the unmanned light vehicle 1 and the traveling path 32 behind the unmanned light vehicle 1 (step SC3).

The determination unit 127 determines whether or not the target vehicle 100 has deviated from the protection area 63 based on the detection data of the target position sensor 20 received by the sensor data reception unit 123 (step SC4).

In a case where it is determined in step SC4 that the target vehicle 100 has deviated from the protection area 63 (step SC4: Yes), the stop command unit 128 stops the unmanned dump truck 2 traveling around the target vehicle 100 (step SC5). The stop command unit 128 transmits a stop command to the unmanned dump truck 2 traveling around the target vehicle 100 via the communication system 13.

In a case where it is determined in step SC4 that the target vehicle 100 has not deviated from the protection area 63 (step SC4: No), the stop command is not output from the stop command unit 128. The unmanned dump truck 2 traveling around the target vehicle 100 continues traveling.

Figure 9:
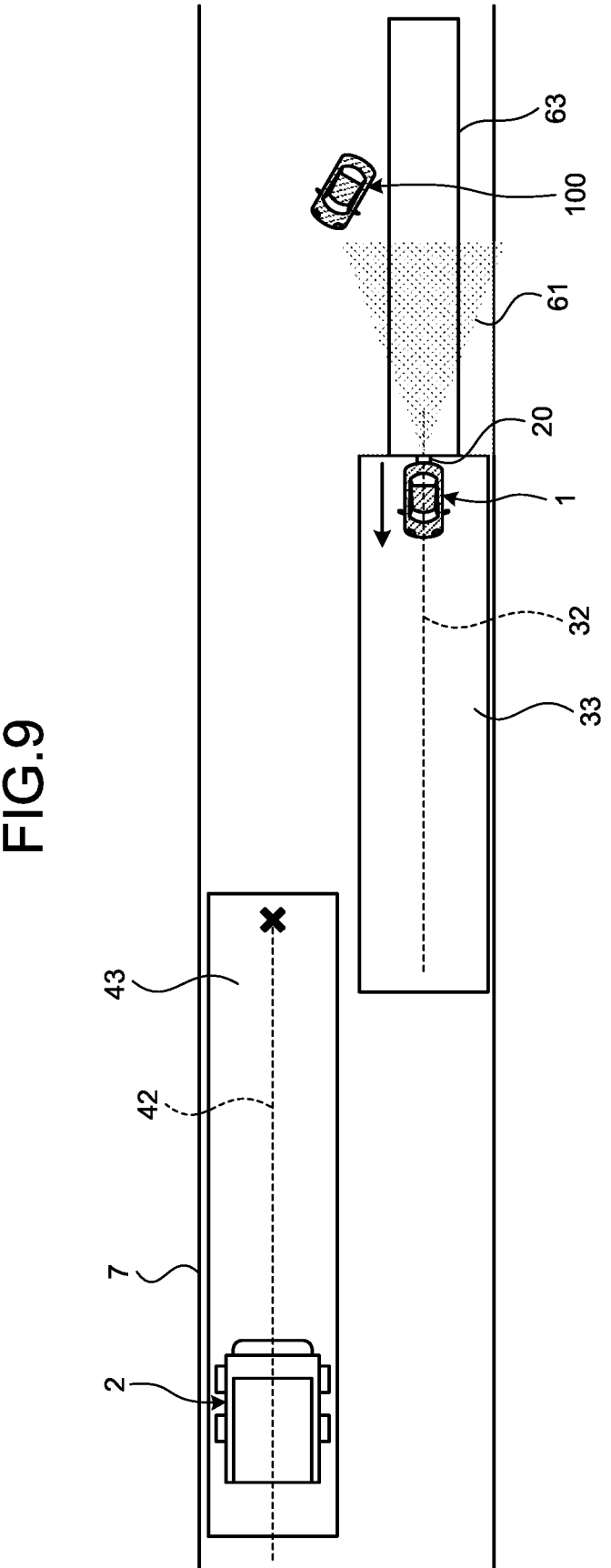
FIG. 9 is a view illustrating a state in which the target vehicle according to the first embodiment has deviated from a protection area.

FIG. 9 is a view illustrating a state in which the target vehicle 100 according to the present embodiment has deviated from the protection area 63. For example, there is a possibility that the target vehicle 100 travels in an unexpected direction due to a driving skill of the driver of the target vehicle 100. In the present embodiment, the protection area 63 in which the target vehicle 100 is to be present is set. Since the protection area 63 is set, the unmanned light vehicle 1 can appropriately guide the target vehicle 100.

When the target vehicle 100 deviates from the protection area 63, there is a possibility that the target vehicle 100 and the unmanned dump truck 2 approach or come into contact with each other. In the present embodiment, the determination unit 127 can determine whether or not the target vehicle 100 has deviated from the protection area 63 based on the detection data of the target position sensor 20. In a case where it is determined that the target vehicle 100 has deviated from the protection area 63, the stop command unit 128 stops the unmanned dump truck 2 traveling around the target vehicle 100. As a result, the target vehicle 100 and the unmanned dump truck 2 are prevented from approaching or coming into contact with each other.

Effects

As described above, according to the present embodiment, the management system 11 includes the first traveling path generation unit 121 that generates the traveling path 32, and the protection area setting unit 124 that sets the protection area 63 in which the target vehicle 100 for escorting is to be present based on the position of the unmanned light vehicle 1 traveling in the work site 10 along the traveling path 32. As the protection area 63 is set, the unmanned light vehicle 1 can appropriately guide the target vehicle 100. In addition, as the protection area 63 is set, the target vehicle 100 guided by the unmanned light vehicle 1 and the unmanned dump truck 2 are prevented from approaching or coming into contact with each other. The target vehicle 100 is protected from the unmanned dump truck 2 by the protection area 63.

The protection area 63 is set based on the position of the unmanned light vehicle 1 traveling along the traveling path 32. The traveling path 32 is generated in such a way as to suppress approach or contact between the unmanned light vehicle 1 and the unmanned dump truck 2. Therefore, there is also a low possibility that the target vehicle 100 guided by the unmanned light vehicle 1 approaches or comes into contact with the unmanned dump truck 2. Since there is a low possibility that the target vehicle 100 guided by the unmanned light vehicle 1 approaches or comes into contact with the unmanned dump truck 2, the protection area setting unit 124 need not to set an excessively large protection area 63 to protect the target vehicle 100 in the protection area 63.

Since the protection area 63 is not excessively large, unnecessary deceleration or stop of the unmanned dump truck 2 is suppressed. Therefore, a decrease in productivity in the work site 10 is suppressed.

The unmanned light vehicle 1 travels in front of the target vehicle 100. The protection area 63 is set behind the unmanned light vehicle 1. The driver of the target vehicle 100 can reach the destination of the work site 10 by traveling behind the unmanned light vehicle 1.

The protection area setting unit 124 can set the protection area 63 in such a way that the target vehicle 100 is located inside the protection area 63 based on the position of the unmanned light vehicle 1 and the traveling path 32. The protection area setting unit 124 can appropriately set the protection area 63 for the target vehicle 100 based on the detection data of the self-position sensor 17 of the unmanned light vehicle 1 and the traveling path 32.

The determination unit 127 can determine whether or not the target vehicle 100 has deviated from the protection area 63 based on the detection data of the target position sensor 20. In a case where it is determined that the target vehicle 100 has deviated from the protection area 63, the stop command unit 128 stops the unmanned dump truck 2 traveling around the target vehicle 100. As a result, the target vehicle 100 and the unmanned dump truck 2 are prevented from approaching or coming into contact with each other.

Modification

In the present embodiment, the unmanned light vehicle 1 travels in front of the target vehicle 100. In addition, the protection area 63 is set behind the unmanned light vehicle 1. The detection area 61 of the target position sensor 20 is defined behind the unmanned light vehicle 1. The unmanned light vehicle 1 may travel behind the target vehicle 100. The protection area 63 may be set in front of the unmanned light vehicle 1. The target position sensor 20 is disposed at the front portion of the vehicle body 101 of the unmanned light vehicle 1 traveling behind the target vehicle 100, and the detection area 61 of the target position sensor 20 is defined in front of the unmanned light vehicle 1, so that the target position sensor 20 can detect whether or not the target vehicle 100 has deviated from the protection area 63.

Second Embodiment

A second embodiment will be described. In the following description, the same or equivalent components as those of the above-described embodiment are denoted by the same reference numerals, and a description of the components is simplified or omitted.

Figure 10:
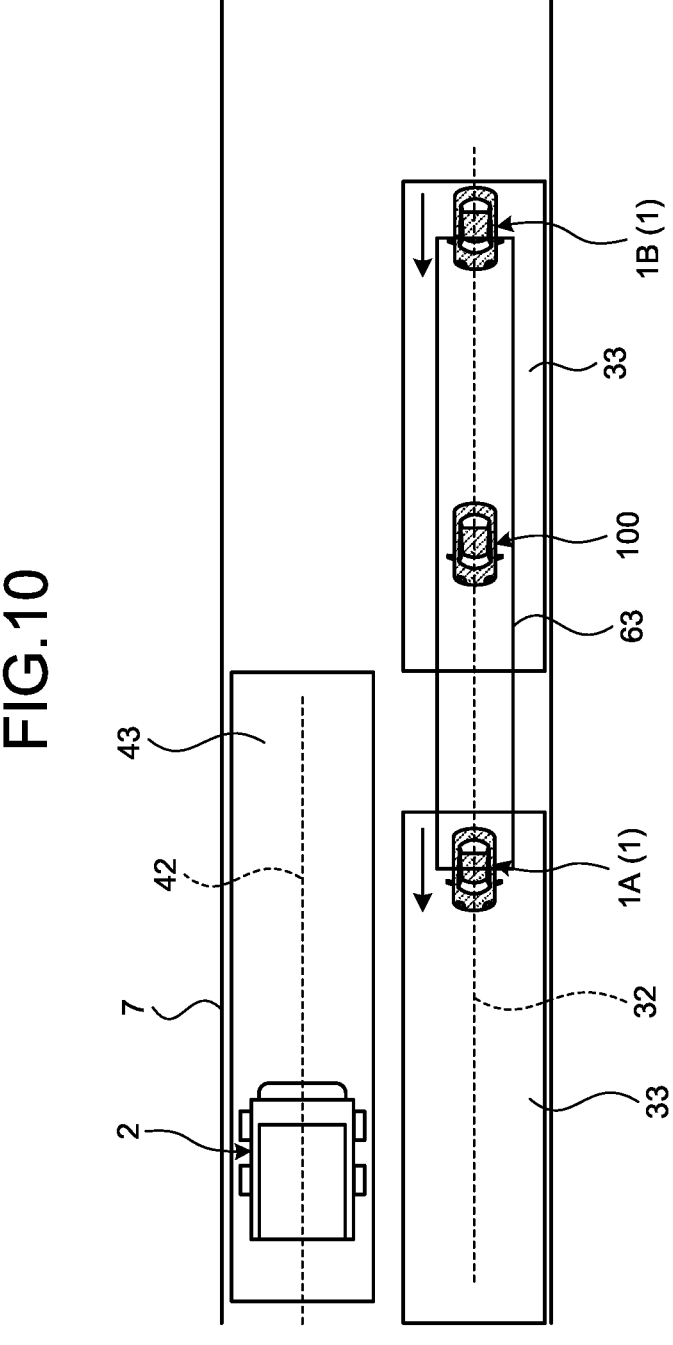
FIG. 10 is a view illustrating a state in which unmanned light vehicles according to a second embodiment escort a target vehicle.

FIG. 10 is a view illustrating a state in which unmanned light vehicles 1 according to the present embodiment escort a target vehicle 100.

In the present embodiment, the unmanned light vehicles 1 that guide the target vehicle 100 include an unmanned light vehicle 1A that is a leading vehicle traveling in front of the target vehicle 100 and an unmanned light vehicle 1B that is a following vehicle traveling behind the target vehicle 100. The target vehicle 100 travels while being sandwiched between the unmanned light vehicle 1A and the unmanned light vehicle 1B in a front-rear direction.

The unmanned light vehicle 1A and the unmanned light vehicle 1B travel along a traveling path 32. The traveling path 32 of the unmanned light vehicle 1A and the traveling path 32 of the unmanned light vehicle 1B are the same traveling path 32. A permitted area 33 is set for each of the unmanned light vehicle 1A and the unmanned light vehicle 1B. The permitted area 33 set for the unmanned light vehicle 1A and the permitted area 33 set for the unmanned light vehicle 1B are different permitted areas 33.

The target vehicle 100 travels substantially along the traveling path 32 by being guided by the unmanned light vehicle 1A and the unmanned light vehicle 1B.

In the present embodiment, a protection area setting unit 124 sets a protection area 63 for the target vehicle 100 based on a position of the unmanned light vehicle 1A, the traveling path 32 of the unmanned light vehicles 1, and a position of the unmanned light vehicle 1B. The position of the unmanned light vehicle 1A is detected by a self-position sensor 17 disposed in the unmanned light vehicle 1A. The position of the unmanned light vehicle 1B is detected by a self-position sensor 17 disposed in the unmanned light vehicle 1B. The protection area setting unit 124 sets the protection area 63 in such a way as to connect the unmanned light vehicle 1A and the unmanned light vehicle 1B based on detection data of the self-position sensor 17 disposed in the unmanned light vehicle 1A, the traveling path 32 generated by a first traveling path generation unit 121, and detection data of the self-position sensor 17 disposed in the unmanned light vehicle 1B.

Figure 11:
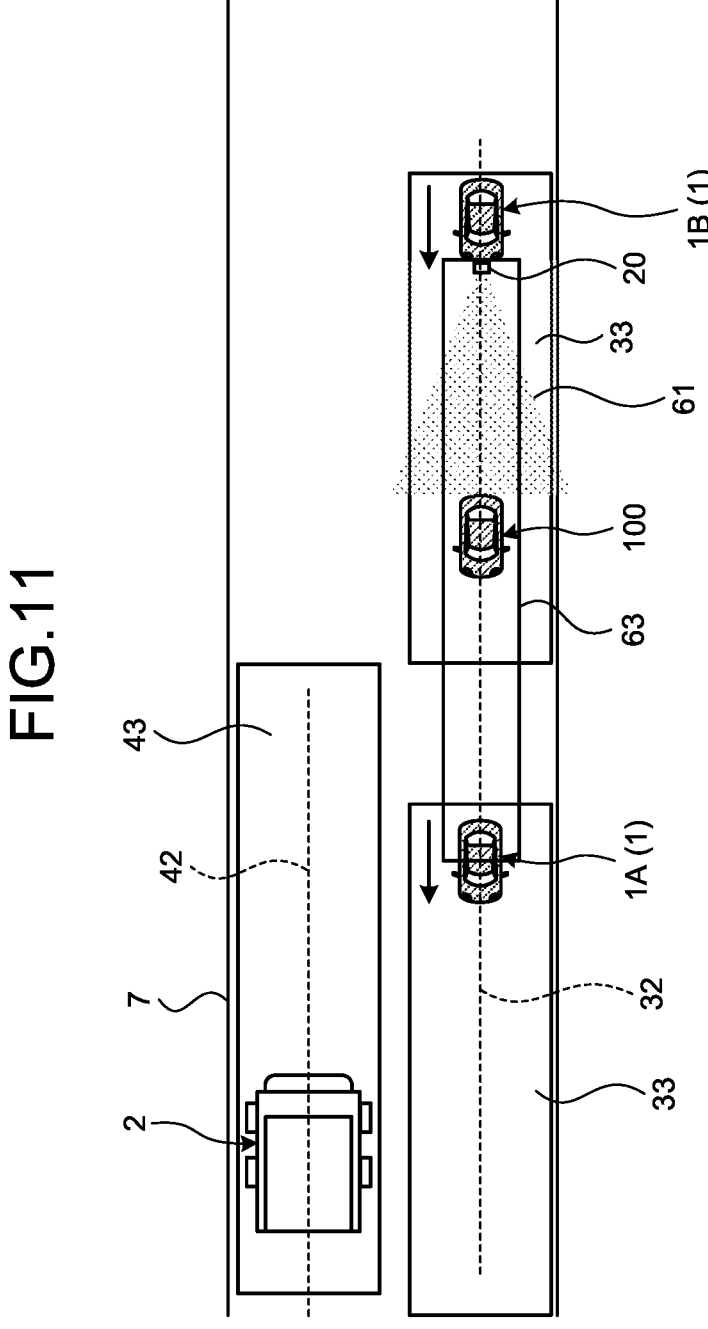
FIG. 11 is a view illustrating a state in which a target position sensor of the unmanned light vehicle according to the second embodiment detects the target vehicle.

FIG. 11 is a view illustrating a state in which a target position sensor 20 of the unmanned light vehicle 1B according to the present embodiment detects the target vehicle 100. As illustrated in FIG. 11, the target position sensor 20 of the unmanned light vehicle 1B traveling behind the target vehicle 100 may detect a relative position between the target vehicle 100 and the unmanned light vehicle 1B. The target position sensor 20 is disposed at a front portion of a vehicle body 101 of the unmanned light vehicle 1B. A determination unit 127 may determine whether or not the target vehicle 100 has deviated from the protection area 63 based on detection data of the target position sensor 20 of the unmanned light vehicle 1B.

As described above, according to the present embodiment, the target vehicle 100 is guided to a destination by the unmanned light vehicle 1A traveling in front of the target vehicle 100 and the unmanned light vehicle 1B traveling behind the target vehicle 100.

Third Embodiment

A third embodiment will be described. In the following description, the same or equivalent components as those of the above-described embodiment are denoted by the same reference numerals, and a description of the components is simplified or omitted.

Figure 12:
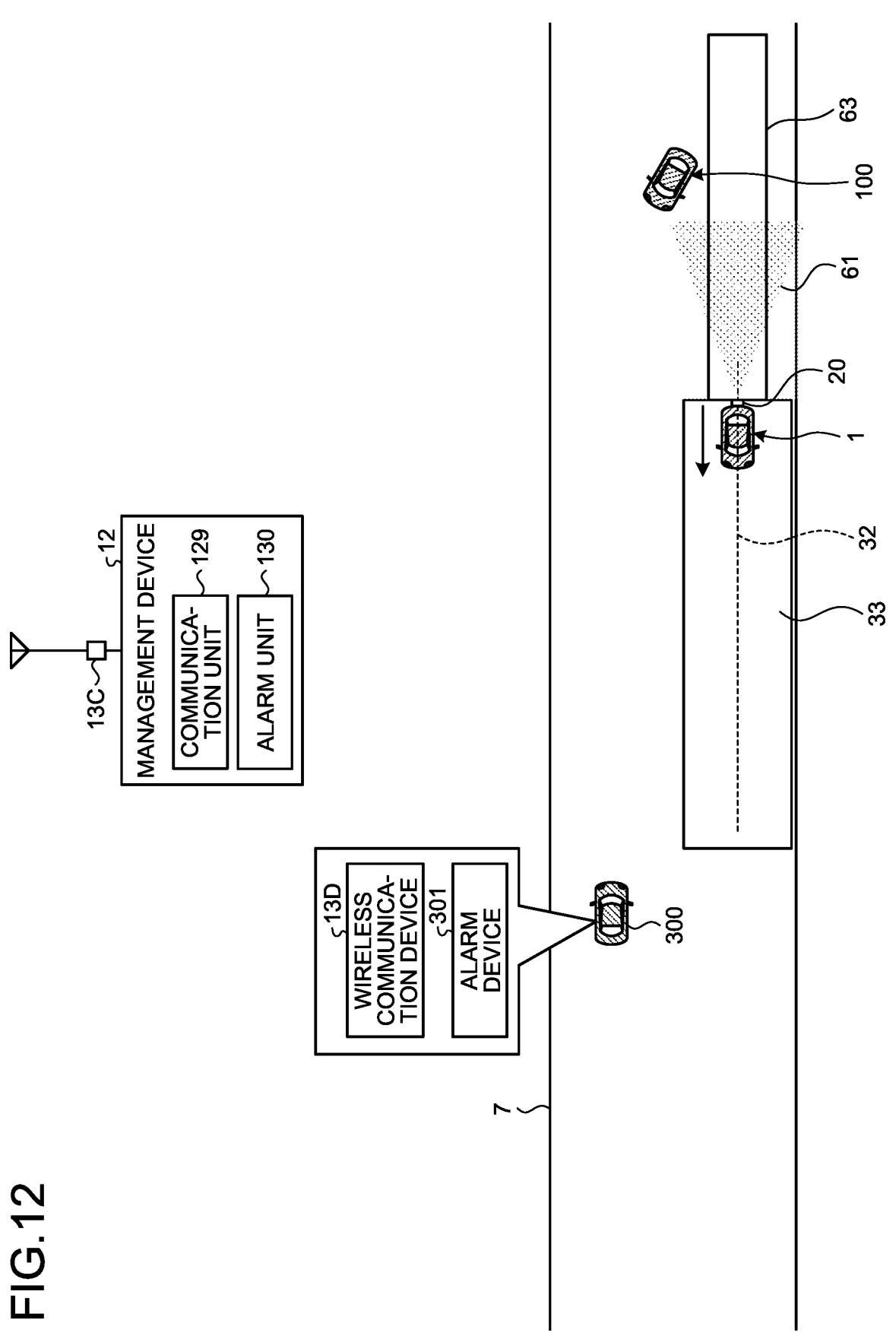
FIG. 12 is a view illustrating a state in which an unmanned light vehicle according to a third embodiment escorts a target vehicle.

FIG. 12 is a view illustrating a state in which an unmanned light vehicle 1 according to a third embodiment escorts a target vehicle 100.

In the present embodiment, the unmanned light vehicle 1 and the target vehicle 100 travel in such a way as to pass a manned vehicle 300. The manned vehicle 300 is a vehicle that travels by a driving operation of a driver in a driving room. A management device 12 includes a communication unit 129 that communicates with the manned vehicle 300 traveling in a work site 10, and an alarm unit 130 that transmits alarm data to the manned vehicle 300 via the communication unit 129 in a case where the determination unit 127 determines that the target vehicle 100 has deviated from a protection area 63. The manned vehicle 300 includes a wireless communication device 13D that communicates with the management device 12 via a communication system 13, and an alarm device 301. As the alarm device 301, a display device that displays alarm data or a sound generation device that outputs an alarm sound is exemplified.

As illustrated in FIG. 12, in a case where the target vehicle 100 deviates from the protection area 63, the alarm unit 130 transmits alarm data to the manned vehicle 300 via the communication unit 129. The alarm device 301 disposed in the manned vehicle 300 operates based on the alarm data transmitted from the management device 12. The driver of the manned vehicle 300 can recognize that the target vehicle 100 has deviated from the protection area 63 based on the operation of the alarm device 301. The driver of the manned vehicle 300 can drive the manned vehicle 300 in such a way as to suppress approach or contact between the manned vehicle 300 and the target vehicle 100.

Other Embodiments

In the above-described embodiment, the protection area setting unit 124 may set the protection area 63 for the target vehicle 100 based only on the position of the unmanned light vehicle 1 traveling in the work site 10 along the traveling path 32. The target vehicle 100 travels substantially along the traveling path 32. For example, in a case where the unmanned light vehicle 1 travels in front of the target vehicle 100, the driver of the target vehicle 100 drives the target vehicle 100 in such a way that the inter-vehicle distance between the unmanned light vehicle 1 and the target vehicle 100 is maintained at a certain value. The protection area setting unit 124 can estimate the inter-vehicle distance between the unmanned light vehicle 1 and the target vehicle 100. The protection area setting unit 124 can set the protection area 63 for the target vehicle 100 based on the position of the unmanned light vehicle 1 and the estimated inter-vehicle distance between the unmanned light vehicle 1 and the target vehicle 100.

In the above-described embodiment, the protection area setting unit 124 may set the protection area 63 based on the traveling path 32 through which the unmanned light vehicle 1 has passed, or may set the protection area 63 based on the traveling path 32 before the unmanned light vehicle 1 passes. That is, the protection area setting unit 124 may set the protection area 63 based on the traveling path 32 after being used for traveling of the unmanned light vehicle 1, or may set the protection area 63 based on the traveling path 32 before being used for traveling of the unmanned light vehicle 1.

In the above-described embodiment, the protection area setting unit 124 may set the protection area 63 based on the position of the unmanned light vehicle 1 traveling in the work site 10. That is, the protection area setting unit 124 may set the protection area 63 not based on the traveling path 32 but based on a traveling trajectory on which the unmanned light vehicle 1 has actually traveled. The protection area setting unit 124 can calculate the traveling trajectory on which the unmanned light vehicle 1 has actually traveled based on the detection data of the self-position sensor 17 of the unmanned light vehicle 1.

In the above-described embodiment, the protection area 63 is an entry prohibited area in which entry of the unmanned dump truck 2 is prohibited. The protection area 63 may function as the entry prohibited area in which entry of an unmanned light vehicle 1 other than the unmanned light vehicle 1 that guides the target vehicle 100 is prohibited. In a case where another unmanned light vehicle 1 travels around the target vehicle 100, the protection area 63 is set for the target vehicle 100 to suppress approach or contact between the another unmanned light vehicle 1 and the target vehicle 100. In addition, in a case where the third unmanned vehicle other than the unmanned light vehicle 1 and the unmanned dump truck 2 travels in the work site 10, the protection area 63 may function as an entry prohibited area in which entry of the third unmanned vehicle is prohibited.

In the above-described embodiment, at least some of the functions of the control device 15 may be provided in the management device 12, or at least some of the functions of the management device 12 may be provided in the control device 15. For example, in the above-described embodiment, the control device 15 of the unmanned light vehicle 1 may have the function of the determination unit 127 that determines whether or not the target vehicle 100 has deviated from the protection area 63. Similarly, at least some of the functions of the control device 16 may be provided in the management device 12, and at least some of the functions of the management device 12 may be provided in the control device 16.

In the above-described embodiment, a plurality of functions of the management device 12 may be implemented by separate hardware. That is, each of the first traveling path generation unit 121, the second traveling path generation unit 122, the sensor data reception unit 123, the protection area setting unit 124, the first permitted area generation unit 125, and the second permitted area generation unit 126 may be implemented by different hardware. Similarly, a plurality of functions of the control device 15 may be implemented by separate hardware, or a plurality of functions of the control device 16 may be implemented by separate hardware.

According to the present disclosure, it is possible to appropriately guide a target vehicle for escorting.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A work site management system comprising: a processor, the processor being configured to:
   a generate a traveling path;
   a set a protection area in which a target vehicle is to be present based on a position of a first unmanned vehicle traveling in a work site along the traveling path; and
   determine whether or not the target vehicle has deviated from the protection area,
   wherein the target vehicle is an escorted vehicle, and is a manned vehicle that travels by a driving operation of a driver in a driving room and that is not managed by a management system.

2. The work site management system according to claim 1, wherein the protection area is set behind the first unmanned vehicle.

3. The work site management system according to claim 1, wherein the processor sets the protection area based on the position of the first unmanned vehicle and the traveling path.

4. The work site management system according to claim 3, wherein the first unmanned vehicle includes a self-position sensor that detects the position of the first unmanned vehicle, and the processor sets the protection area based on detection data of the self-position sensor and a position of the traveling path.

5. The work site management system according to claim 3, wherein the processor sets the protection area in such a way as to include at least a part of the first unmanned vehicle and at least a part of the traveling path.

6. The work site management system according to claim 1, wherein the first unmanned vehicle includes a leading vehicle traveling in front of the protection area and a following vehicle traveling behind the protection area.

7. The work site management system according to claim 1, wherein the first unmanned vehicle includes a leading vehicle traveling in front of the protection area and a following vehicle traveling behind the protection area, and the processor sets the protection area in such a way as to connect the leading vehicle and the following vehicle.

8. The work site management system according to claim 1, wherein the processor determines whether or not the target vehicle has deviated from the protection area based on a relative position between the first unmanned vehicle and the target vehicle.

9. The work site management system according to claim 8, wherein the first unmanned vehicle includes a target position sensor that detects the relative position between the first unmanned vehicle and the target vehicle, and the processor determines whether or not the target vehicle has deviated from the protection area based on detection data of the target position sensor.

10. The work site management system according to claim 1, com wherein the processor controls a second unmanned vehicle traveling in the work site to stop in a case where it is determined that the target vehicle has deviated from the protection area.

11. The work site management system according to claim 1, wherein the processor a communicates with a manned vehicle traveling in the work site; and an transmits alarm data to the manned vehicle v on un in a case where it is determined that the target vehicle has deviated from the protection area.

12. The work site management system according to claim 1, wherein the processor is configured to:

control a second unmanned vehicle traveling in the work site according to a determination that the target vehicle has deviated from the protection area.

13. A work site management method comprising:

guiding a target vehicle by a first unmanned vehicle traveling in a work site along a traveling path; and setting a protection area in which the target vehicle is to be present based on a position of the first unmanned vehicle; and determining whether or not the target vehicle has deviated from the protection area, wherein the target vehicle is an escorted vehicle, and is a manned vehicle that travels by a driving operation of a driver in a driving room and that is not managed by a management system.

14. The work site management method according to claim 13, wherein the protection area is set behind the first unmanned vehicle.

15. The work site management method according to claim 13, wherein the protection area is set based on the position of the first unmanned vehicle and the traveling path.

16. The work site management method according to claim 15, wherein the first unmanned vehicle includes a self-position sensor that detects the position of the first unmanned vehicle, and the work site management method comprises setting the protection area based on detection data of the self-position sensor and a position of the traveling path.

17. The work site management method according to claim 13, comprising determining whether or not the target vehicle has deviated from the protection area based on a relative position between the first unmanned vehicle and the target vehicle.

18. The work site management method according to claim 17, wherein the first unmanned vehicle includes a target position sensor that detects the relative position between the first unmanned vehicle and the target vehicle, and the work site management method comprises determining whether or not the target vehicle has deviated from the protection area based on detection data of the target position sensor.

19. The work site management method according to claim 13, comprising controlling a second unmanned vehicle traveling in the work site to stop in a case where it is determined that the target vehicle has deviated from the protection area.

20. The work site management method according to claim 13, comprising controlling a second unmanned vehicle traveling in the work site according to a determination that the target vehicle has deviated from the protection area.

* * * * *